United States Patent

Injeyan et al.

[11] Patent Number: 5,640,406
[45] Date of Patent: Jun. 17, 1997

[54] BIREFRINGENCE COMPENSATED LASER ARCHITECTURE

[75] Inventors: Hagop Injeyan, Glendale; Randall J. St. Pierre, Santa Monica, both of Calif.

[73] Assignee: TRW Inc., Redondo Beach, Calif.

[21] Appl. No.: 415,880

[22] Filed: Apr. 3, 1995

Related U.S. Application Data

[63] Continuation-in-part of Ser. No. 148,758, Nov. 5, 1993, Pat. No. 5,555,254.

[51] Int. Cl.$^6$ .................................................. H01S 3/00
[52] U.S. Cl. ........................... 372/33; 372/105; 372/106
[58] Field of Search ............................ 372/33, 105, 106; 359/338, 342, 344

[56] References Cited

U.S. PATENT DOCUMENTS

| | | | |
|---|---|---|---|
| 4,872,181 | 10/1989 | Johnson et al. | 372/106 |
| 4,918,395 | 4/1990 | Difonzo et al. | 330/4.3 |
| 4,935,932 | 6/1990 | Johnson et al. | 372/33 |
| 4,943,782 | 7/1990 | Stephens et al. | 359/338 |
| 4,949,358 | 8/1990 | Kantorski et al. | 372/94 |
| 4,955,725 | 9/1990 | Johnson et al. | 372/22 |
| 5,018,163 | 5/1991 | Daunt et al. | 372/68 |
| 5,127,019 | 6/1992 | Epstein et al. | 372/108 |
| 5,142,548 | 8/1992 | Krasinski et al. | 372/105 |
| 5,199,042 | 3/1993 | Papetti et al. | 372/95 |
| 5,247,562 | 9/1993 | Steinbach | 378/119 |
| 5,268,787 | 12/1993 | McIntire | 359/347 |
| 5,272,717 | 12/1993 | Stulz | 372/3 |
| 5,317,447 | 5/1994 | Baird et al. | 359/328 |
| 5,321,718 | 6/1994 | Waarts et al. | 372/108 |
| 5,325,380 | 6/1994 | Clendening et al. | 372/23 |
| 5,351,250 | 9/1994 | Scott | 372/3 |
| 5,357,359 | 10/1994 | Uchiyama et al. | 359/123 |
| 5,448,579 | 9/1995 | Chang et al. | 372/27 |

OTHER PUBLICATIONS

D. Carr & D.C. Hanna, *Performance of a Nd:YAG Oscillator/Amplifier with Phase–Conjugation via Stimulated Brillouin Scattering*, Appl. Phys. B 36, 83–92 (1985) No Month.

*Primary Examiner*—Rodney B. Bovernick
*Assistant Examiner*—Robert E. Wise
*Attorney, Agent, or Firm*—Michael S. Yatsko

[57] ABSTRACT

Apparatus, and a related method, for compensating for birefringence introduced in a birefringent medium, such as a solid-state amplifier. The invention includes the combination of a quarter-wave plate, a Faraday rotator and a mirror, which may be a phase conjugation cell. Light passing through the quarter-wave plate is substantially circularly polarized, which is advantageous if the mirror is a phase conjugation cell using stimulated Brillouin scattering (SBS). A second pass through the quarter-wave plate provides a linearly polarized beam of which the polarization angle is orthogonally related to that of the original beam, to facilitate out-coupling of energy from the apparatus. The Faraday rotator effects a total polarization angle rotation of 90° in two passes and helps compensate for birefringence when the beam is passed through the birefringent medium again on the return pass. The combination of the quarter-wave plate and the Faraday rotator provides better birefringence cancellation than either element acting alone.

7 Claims, 1 Drawing Sheet

BIREFRINGENCE COMPENSATED LASER ARCHITECTURE

CROSS-REFERENCE TO RELATED APPLICATION

This is a continuation-in-part of application Ser. No. 08/148,758 filed Nov. 5, 1993 now U.S. Pat. No. 5,555,254, and entitled "High Brightness Solid-State Laser with Zig-Zag Amplifier".

BACKGROUND OF THE INVENTION

This invention relates generally to high-power solid-state lasers and, more particularly, to techniques for reducing birefringence in solid-state lasers. Solid-state lasers with an average power up to 100 W (watts), and even higher powers, are needed in a variety of military, industrial and commercial applications, including X-ray photolithography, laser machining and drilling, space and underwater communication, and medical applications.

The brightness of a laser beam is proportional to the average power and is inversely proportional to the square of the beam quality, where the beam quality is in turn defined in relation to a diffraction-limited beam, i.e., a diffraction-limited beam has an ideal beam quality of 1.0. A worse beam quality of, say, 1.5 results in a brightness of $1/(1.5)^2$ or 44.4% of the brightness of the diffraction limited beam. Since the brightness falls off in proportion to the square of the beam quality, it is extremely important to control the beam quality if high brightness is a design goal. The parent application cross-referenced above was principally concerned with various structural features that improved beam quality and brightness. Another aspect of the same problem is birefringence in the optical components used to generate the beam. Birefringence can be optically filtered from the output beam, and discarded to avoid equipment damage, but the removal of the birefringence component results in a lower output power and brightness. Therefore, it is more desirable to compensate for birefringence rather than to remove it from the output beam.

A number of laser architectures disclosed in various prior patents use a phase conjugated master oscillator power amplifier (PC MOPA) configuration, but still fail to produce a desirably bright beam, or have other drawbacks. The parent application cross-referenced above discloses and claims a high brightness solid-state laser source that includes a master oscillator, a solid-state amplifier and a phase conjugation cell positioned to receive the amplified beam from the solid-state amplifier and to reflect the beam in phase conjugated form back into the solid-state amplifier for a second pass. Aberrations introduced in the amplifier during the first pass are practically canceled during the second pass and the amplified beam has both high power and good beam quality. Although this laser source operates satisfactorily in many applications, it still suffers from birefringence as the amplifier heats up in operation. At higher temperatures, the amplifier crystal is thermally stressed and becomes anisotropic, exhibiting different indices of refraction along its different axes. Consequently, light propagates through the crystal at different speeds along the different axes, resulting in birefringence. Light emerging from the amplifier is no longer linearly polarized, but in general is elliptically polarized to some degree.

As described in the cross-referenced patent application, birefringence components in the amplified beam subject the master oscillator to possibly serious damage if they are reflected back into the master oscillator. One way to avoid this problem is to install a Faraday rotator, referred to in the prior description as a Faraday isolator, next to the master oscillator. The Faraday rotator protects the master oscillator from energy leaking through a polarizer used to couple an output light beam from the laser source. In theory, the polarizer reflects the light beam returning from the amplifier and thereby couples it out of the laser source. However, any birefringence components in the return beam will pass through the polarizer and back into the master oscillator, which can be seriously damaged as a result. The Faraday rotator rotates the polarization direction by 45° on each pass, with the result that the birefringence components are effectively dumped out of the system by the polarizer. This is a known technique for removing birefringence components. Since the components are effectively discarded, they represent a loss in the power of the output laser beam.

The foregoing is only one example of an optical system in which unwanted birefringence arises. More generally, there is a need for birefringence compensation in a variety of optical systems.

It has been proposed by I. D. Carr and D. C. Hanna, in a paper entitled *Performance of a Nd:YAG Oscillator/Amplifier with Phase-Conjugation via Stimulated Brillouin Scattering*, Appl. Phys. B 36, 83–92 (1985), that a Faraday rotator may be positioned between an amplifier and a mirror in a master oscillator power amplifier (MOPA) system, to reduce birefringence effects. Birefringence effects manifest themselves in the form of two light beams that, because of anisotropic crystalline properties of the amplifier as the temperature increases, travel at different velocities. The amplifier crystal exhibits a lower index of refraction, and a correspondingly higher speed of transmission in one direction, as compared with an orthogonal direction in which the index is higher and the speed of transmission lower. If light from the amplifier is rotated 45° by the Faraday rotator and then an additional 45° during a return pass through the Faraday rotator, the resulting light beam has its "fast" and "slow" components interchanged. A second pass through the amplifier effectively nullifies the birefringence. Intuitively, one can appreciate this effect by considering that the "fast" component of the beam takes the "slow" path through the amplifier crystal on the return pass. Likewise, the "slow component of the beam takes the" "fast" path. The net effect, in theory, is to nullify the birefringence components in the amplified beam.

A practical difficulty with this approach to compensating for birefringence is that it cannot be used to advantage with one of the most commonly used phase conjugating mirrors, the stimulated Brillouin scattering (SBS) cell. In an SBS cell, containing a suitable SBS medium, such as liquid freon or gaseous nitrogen, the SBS process reverses the wavefront of an input beam. (Portions of the wavefront that were lagging become leading, and vice versa.) Aberrations impressed on the wavefront during the first pass through the amplifier are, therefore, negated and virtually removed during the second pass after reflection from the SBS cell. The SBS cell operates most effectively when the incident light is circularly polarized and the SBS medium is subject to optical breakdown if linearly polarized light is used. Therefore, use of a Faraday rotator to compensate for birefringence limits the effectiveness of the SBS cell because the incident beam is predominantly linearly polarized.

Another practical difficulty with Faraday rotators is that they do not always provide a desired angle of rotation of the direction of polarization. If the nominal rotation angle is 45°, it is not uncommon for the actual rotation angle to be in error by a few degrees, and for spatial variations to occur over the aperture of the rotator. After two passes through the rotator, the expected rotation angle of 90° may be in error by as much as ±5° or more. Clearly, this inaccuracy results in less than complete birefringence compensation.

In the laser source described in the cross-referenced application, a quarterwave plate located next to the SBS cell serves to produce circularly polarized light. More specifically, on the first pass through the quarter-wave plate the linear polarization of the beam is converted to circular polarization. On the return pass, the circularly polarized beam is converted back to linearly polarized light, but with a polarization direction orthogonal to that of the original beam. The orthogonal relationship between the forward and return beams is used to outcouple light by means of a polarizer.

Although a quarter-wave plate produces circularly polarized light, which is desirable for operation of an SBS phase conjugating mirror, the plate does not provide birefringence compensation. A significant birefringence component finds its way back to the master oscillator, where it must be removed to avoid equipment damage. Therefore, it will be appreciated that there is still a need for improvement in techniques for birefringence compensation in laser sources having medium to high power and good beam quality. The present invention satisfies this need.

SUMMARY OF THE INVENTION

The present invention resides in a laser architecture for compensating for optical birefringence. Briefly, and in general terms, the laser architecture of the invention comprises a quarter-wave plate disposed in the path of a laser light beam that is substantially linearly polarized but may contain a birefringence component as a result of passing through a birefringent medium; a polarization angle rotator, preferably based on the Faraday effect, disposed in the path of light emerging from the quarter-wave plate, and selected to provide a polarization angle rotation of approximately 45°; and a mirror disposed in the path of light emerging from the polarization angle rotator, to provide a reflected light beam passing back through the polarization angle rotator and the quarter-wave plate. The reflected light beam is subject to another 45° polarization angle rotation in the polarization angle rotator, and any birefringence component is nullified when the reflected beam is passed back through the birefringent medium.

In a disclosed embodiment of the invention, the mirror is a stimulated Brillouin scattering (SBS) phase conjugation cell, which operates more efficiently when receiving circularly polarized light as a result of the presence of the quarter-wave plate. In the disclosed embodiment, the birefringent medium is an optical amplifier and the architecture further comprises a type II frequency doubler for providing light output at double the normal frequency. The polarization angle rotator is a conventional Faraday rotator.

The invention may also be defined as a phase conjugated master oscillator power amplifier (PC MOPA) with birefringence compensation. The PC MOPA comprises a master oscillator generating a pulsed input beam having a nearly diffraction limited beam quality; a solid-state amplifier positioned to receive and amplify the beam from the master oscillator, during a first pass through the amplifier, wherein the solid-state amplifier may introduce a birefringent component into the light beam; a phase conjugation cell positioned to receive the amplified input beam from the solid-state amplifier and to reflect the beam in phase conjugated form back into the solid-state amplifier for a second pass, whereby aberrations introduced in the solid-state amplifier during the first pass are practically canceled during the second pass; a quarter-wave plate positioned to receive light from the solid-state amplifier in the first pass; a Faraday rotator positioned between the quarter-wave plate and the phase conjugation cell, to effect a polarization angle rotation of approximately 90° as a result of the first and second passes through the rotator; and a polarizer for extracting an output beam from the laser architecture. Light beams in the first and second passes have orthogonally related polarization angles and can, therefore, be separated by the polarizer for extraction of an output beam. The combination of the quarter-wave plate and the Faraday rotator effectively nullify any birefringence component when a second pass is made through the solid-state amplifier, which thermally induces birefringence in the first pass.

In terms of a method of birefringence compensation, the invention comprises the steps of passing a primary light beam through a quarter-wave plate, the primary light beam being substantially linearly polarized but containing a possible birefringence component as a result of having passed through a birefringent medium; passing the primary light beam output from the quarter-wave plate through a Faraday rotator, to effect a rotation in polarization by approximately 45°; reflecting light output from the Faraday rotator back into the Faraday rotator and thence through the quarterwave plate again; and passing the reflected light beam emerging from the quarter-wave plate back through the birefringent medium to nullify any birefringent components.

It will be appreciated from the foregoing that the present invention provides a significant advance over existing techniques for birefringence compensation. In particular, the combination of a quarter-wave plate and a Faraday rotator together provide compensation that is approximately ten times better than can be obtained using the quarter-wave plate alone, or approximately two and a half times better than can be obtained using the Faraday rotator alone. Other aspects and advantages of the invention will become apparent from the following more detailed description, taken in conjunction with the accompanying drawings.

DESCRIPTION OF THE PREFERRED EMBODIMENT

Figure 1:
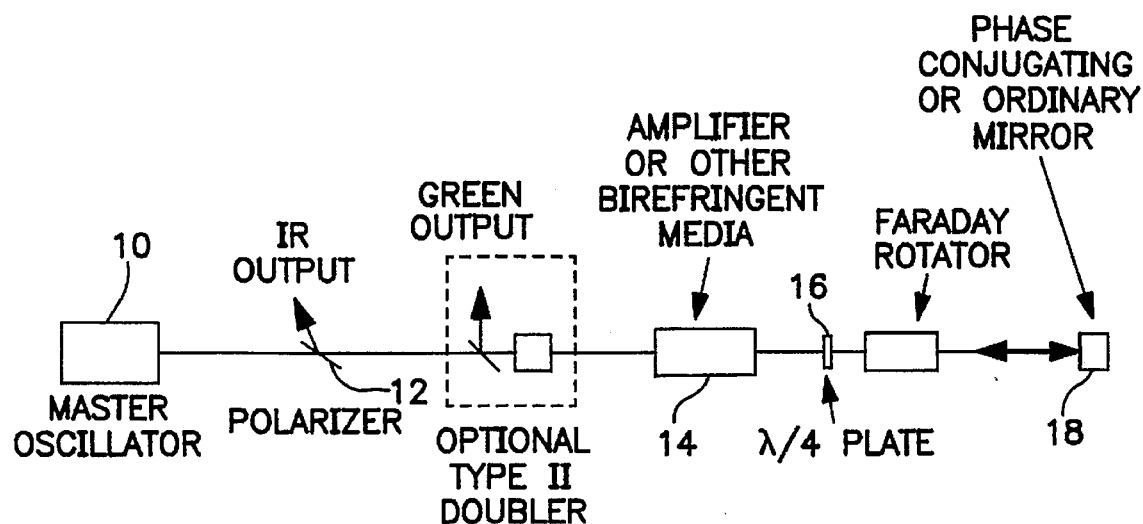
FIG. 1 is a an optical schematic diagram of a phase conjugated master oscillator power amplifier (PC MOPA) configuration including birefringence compensation in accordance with the present invention.

As shown in the drawings for purposes of illustration, the present invention pertains to birefringence compensation, especially as applied to laser light sources of medium to high power. Although the phase-conjugated master oscillator power amplifier (PC MOPA) configuration has been used in many variations, all have to date suffered from less than outstanding beam quality and, therefore, diminished brightness levels. The configuration described and claimed in the cross-referenced application overcomes many of the difficulties of the prior art but still suffers from significant birefringence.

The present invention may be used in a variety of applications in which it is desired to compensate for or nullify birefringence effects. An example of such an application is birefringence compensation in a PC MOPA, such as the one shown diagrammatically in FIG. 1. This configuration includes a master oscillator, indicated by reference numeral 10, a polarizer 12, an amplifier 14, a quarter-wave plate 16, and a phase conjugation mirror 18. The MOPA architecture may also include additional components, some of which are described in more detail in the cross-referenced application, but which are not directly pertinent to the present invention. The master oscillator 10 produces a high quality, low energy optical beam of insufficient power for many purposes. The master oscillator beam may be first passed through a beam shaping telescope (not shown), to further condition the beam, before it enters the amplifier 14. It will be understood that the amplifier 14 is mentioned as one example of a source of birefringence. In the more general case, birefringence may be introduced by some other birefringence medium, or by another component in the optical train, and the birefringence may be statically or thermally induced. The amplifier 14, which may consist of a string of amplifiers, amplifies the beam on a first pass and the beam then is transmitted onto the phase conjugation mirror 18. Again, phase conjugation is not an essential element of the present invention, but is an important component of the PC MOPA configuration. Almost certainly, the amplifier 14 causes phase aberrations in optical wavefronts of the beam as it passes through the amplifier medium. However, as is well known, phase conjugation may be used to cancel these aberrations by passing a phase-conjugated form of the beam back through the amplifier 14.

Extraction of an output beam from the architecture shown in FIG. 1 is effected by means of the Faraday rotator 22 and the polarizer 12. The Faraday rotator 22 rotates the polarization angle of the beam as a result of two passes through the rotator. More specifically, on the first pass through the rotator beam polarization is rotated 45° and on the return pass the polarization is rotated another 45°, resulting in a polarization direction orthogonal to that of the original beam. Since the amplified beam leaving the amplifier 14 on the return pass has an orthogonal polarization with respect to the input beam, the polarizer 12 can be used to extract the output beam. As described in the cross-referenced patent application, an alternative extraction scheme uses only a quarter wave plate 16 to rotate the polarization angle of the beam as a result of two passes through the plate. More specifically, on the first pass through the quarter-wave plate, the linear polarization of the beam is converted to circular polarization due to birefringence in the plate. On the return pass, the circularly polarized beam is converted back to linearly polarized light but with a polarization direction orthogonal to that of the original beam. In the present invention, however, the quarter-wave plate 16 is positioned in front of the Faraday rotator 22, and the quarter-wave plate only serves to provide circularly polarized light in the rotator and the SBS cell.

In accordance with the present invention, birefringence is substantially nullified by a combination of the quarter-wave plate 16 and a Faraday rotator 22 positioned between the quarter-wave plate and the mirror 18. Although the Faraday rotator 22 alone should, in theory, operate to compensate for birefringence, in practice, functioning alone, it does not completely achieve the desired result, as shown by Carr and Hanna in the paper referenced above. The Faraday rotator 22 alone effects an overall rotation of approximately 90° in the polarization angle, but because the rotation angle is typically not exactly 90° over its entire aperture, birefringence is not completely nullified. The quarter-wave plate 16 positioned in front of the Faraday rotator 22 provides circularly polarized light in the rotator, which serves to reduce the sensitivity of birefringence compensation to the Faraday rotation angle, and substantially improves compensation. Further, use of the Faraday rotator alone does not produce circularly polarized light, which is desired for use in an SBS phase conjugation mirror to avoid breakdown in the SBS medium.

Figure 2:
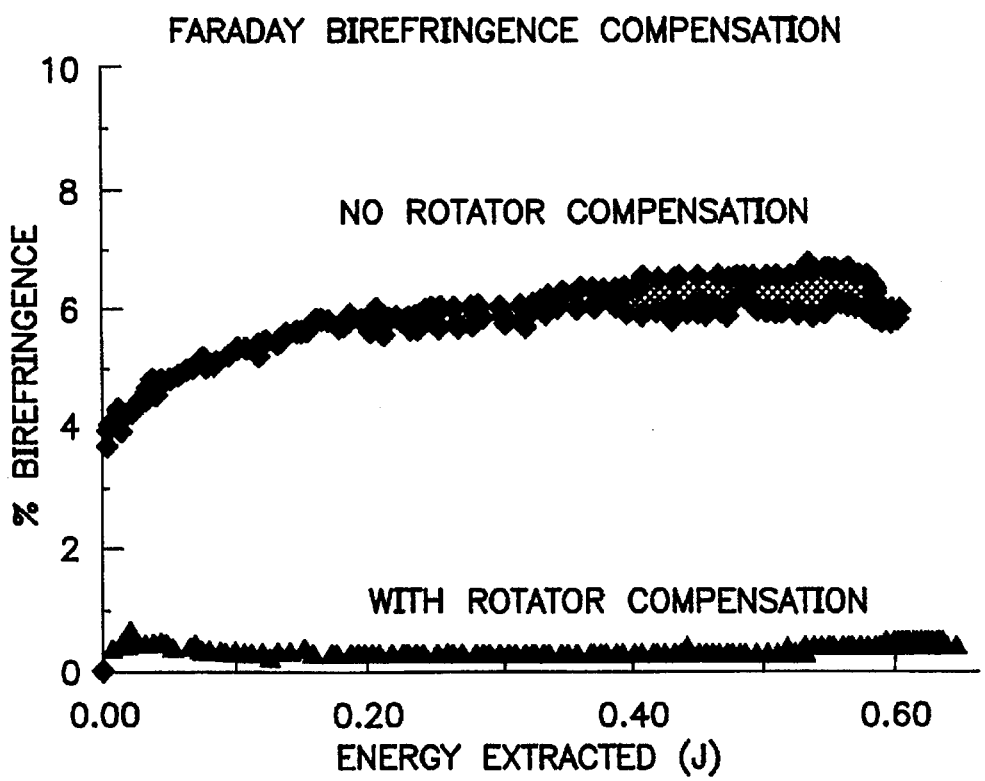
FIG. 2 is a graph showing the improvement in birefringence compensation obtained by use of the invention.

The combined effect of the quarter-wave plate 16 and the Faraday rotator 22 is to compensate for birefringence almost completely. By way of example, the graph of FIG. 2 shows the percentage birefringence plotted against the energy extracted from the laser light source. Using the quarter-wave plate 16 alone (curve A), there is still about 6–7% birefringence in the return beam from the amplifier 14. With the quarter-wave plate 16 and the Faraday rotator 22 operating in tandem, birefringence is reduced to below 1%. More precise measurements show that birefringence is reduced by approximately a factor of ten using the combination of the present invention.

Successful operation of the combination is dependent upon the correct angular orientation of the quarter-wave plate 16. Therefore, initial adjustment of the orientation of the quarter-wave plate is needed to maximize birefringence cancellation.

It should also be noted the quarter-wave plate 16 and the Faraday rotator 22 cannot be interchanged. That is, the Faraday rotator 22 must be positioned between the quarter-wave plate 16 and the mirror 18. The invention simply will not work with the two components reversed in position and they will substantially nullify each other.

Although the effectiveness of the combination is easily demonstrated, its theory of operation is not intuitive. An important aspect of the theory is that the combination of the quarter-wave plate 16 and Faraday rotator 22 has a reduced sensitivity to the angle of rotation induced by the Faraday rotator. Although this insensitivity to the Faraday rotation angle can be demonstrated mathematically, it is not intuitively obvious that such a result would follow from a combination of the quarter-wave plate and the Faraday rotator. In the experimental observations mentioned above, in which a ten-fold reduction in birefringence was obtained, the Faraday rotator employed had a measured average angle of rotation of 42° and exhibited spatial non-uniformities in its magnetic field. These spatial non-uniformities produce spatial variations in the amount of polarization rotation effected by the device. The quarter-wave plate 16 used in the combination of the invention compensates to a very large degree for these departures from the desired theoretical rotation angle of 45°.

The Faraday rotator 22 corrects for depolarization caused by elements of the optical train, by introducing a rotation of approximately 90° in the polarization angle of the beam returning from the mirror 18.

A further advantage of the invention is that, when used in conjunction with a phase conjugation mirror that relies on stimulated Brillouin scattering (SBS) for its operation, the combination provides circularly polarized light to the SBS cell. As is well known, the use of circularly polarized light in the SBS cell increases its dynamic range by increasing the threshold for breakdown.

Another advantage of the invention is that, when used in conjunction with a phase conjugation mirror, the invention allows the use of a type II doubler in the phase conjugation path. Type II doublers have a random residual birefringence that passes through 0°–180° cycles as the doubler crystal is tuned for phase matching. The quarter-wave plate and Faraday rotator combination eliminates the sensitivity of the optical train to this type of birefringence.

It will be appreciated from the foregoing that the present invention represents an important advance in techniques for birefringence compensation. In particular, the invention achieves a substantial reduction in birefringence induced thermally or otherwise in optical components such as amplifiers in laser light sources. It will also be appreciated that various modifications may be made without departing from the spirit and scope of the present invention. Accordingly the invention should not be limited except as by the following claims.

We claim:

1. A laser architecture for compensating for optical birefringence, comprising:

a quarter-wave plate disposed in the path of a laser light beam that is substantially linearly polarized but may contain a birefringence component as a result of passing through a birefringent medium;

a polarization angle rotator disposed in the path of light emerging from the quarter-wave plate, and selected to provide a polarization angle rotation of approximately 45°; and a mirror disposed in the path of light emerging from the polarization angle rotator, to provide a reflected light beam passing back through, first, the polarization angle rotator and then through the quarter-wave plate, whereby the reflected light beam is subject to another approximately 45° polarization angle rotation in the polarization angle rotator and has any birefringence component nullified when passed back through the birefringent medium, wherein the quarter-wave plate reduces the sensitivity of birefringence compensation to polarization angle rotator errors.

2. A laser architecture for compensating for optical birefringence, as defined in claim 1, wherein:

the polarization angle rotator is one based on the Faraday effect.

3. A laser architecture for compensating for optical birefringence, as defined in claim 1, wherein:

the polarization angle rotator is a Faraday rotator.

4. A phase conjugated master oscillator power amplifier (PC MOPA) with birefringence compensation, comprising:

a master oscillator generating a pulsed input beam having a nearly diffraction limited beam quality;

a solid-state amplifier positioned to receive and amplify the beam from the master oscillator, during a first pass through the amplifier, wherein the solid-state amplifier may introduce a birefringent component to the light beam;

a phase conjugation cell positioned to receive the amplified input beam from the solid-state amplifier and to reflect the beam in phase conjugated form back into the solid-state amplifier for a second pass, whereby aberrations introduced in the solid-state amplifier during the first pass are practically canceled during the second pass;

a quarter-wave plate positioned to receive light from the solid-state amplifier in the first pass;

a Faraday rotator positioned between the quarter-wave plate and the phase conjugation cell, to effect a polarization angle rotation of approximately 90° as a result of the first and second passes through the rotator; and a polarizer for extracting an output beam from the laser architecture, wherein the light beams in the first and second passes have orthogonally related polarization angles and can therefore be separated by a polarizer;

wherein the combination of the quarter-wave plate and the Faraday rotator effectively nullify any birefringence component when the second pass is made through the solid-state amplifier.

5. A method of compensating for birefringence introduced in a birefringent medium in an optical system through which a laser beam passes, the method comprising the steps of:

passing a primary light beam through a quarter-wave plate, wherein the primary light beam is substantially linearly polarized but contains a possible birefringence component as a result of passing through a birefringent medium;

passing the primary light beam output from the quarter-wave plate through a Faraday rotator, to effect a rotation in polarization by approximately 45°;

reflecting light output from the Faraday rotator back, first into the Faraday rotator and thence from the Faraday rotator through the quarter-wave plate again; and passing the reflected light beam emerging from the quarter-wave plate back through the birefringent medium to nullify any birefringent components;

wherein the foregoing combination of steps has the effect of reducing the sensitivity of birefringence compensation to Faraday rotator rotation angle errors.

6. A laser architecture for compensating for optical birefringence, comprising:

a quarter-wave plate disposed in the path of a laser light beam that is substantially linearly polarized but may contain a birefringence component as a result of passing through a birefringent medium;

a polarization angle rotator disposed in the path of light emerging from the quarter-wave plate, and selected to provide a polarization angle rotation of approximately 45°; and a mirror disposed in the path of light emerging from the polarization angle rotator, to provide a reflected light beam passing back through the polarization angle rotator and the quarter-wave plate, whereby the reflected light beam is subject to another 45° polarization angle rotation in the polarization angle rotator and has any birefringence component nullified when passed back through the birefringent medium, and wherein the mirror is a stimulated Brillouin scattering (SBS) phase conjugation cell, which operates more efficiently as a result of receiving circularly polarized light.

7. A laser architecture for compensating for optical birefringence, comprising:

a quarter-wave plate disposed in the path of a laser light beam that is substantially linearly polarized but may contain a birefringence component as a result of passing through birefringent medium in the form of an optical amplifier;

a polarization angle rotator disposed in the path of light emerging from the quarter-wave plate, and selected to provide a polarization angle rotation of approximately 45°;

a mirror disposed in the path of light emerging from the polarization angle rotator, to provide a reflected light beam passing back through the polarization angle rotator and the quarter-wave plate, whereby the reflected light beam is subject to another 45° polarization angle rotation in the polarization angle rotator and has any birefringence component nullified when passed back through the birefringent medium; and a type II frequency doubler for providing light output at a double frequency.

* * * * *